G. F. Stone,
Soldering Metal Cans.
No. 53,751. Patented Apr. 3, 1866.
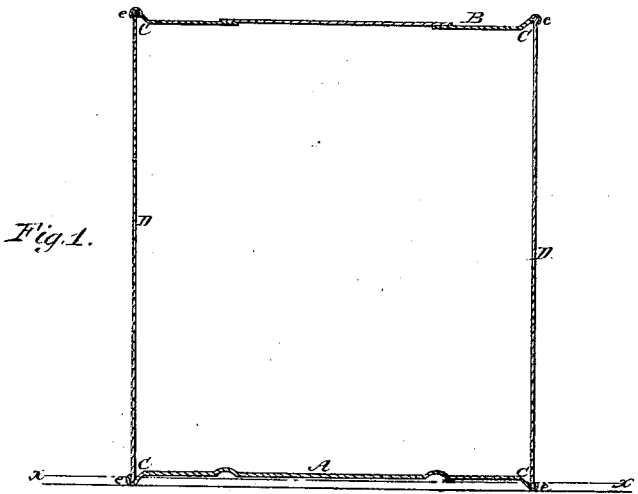
Fig. 1.
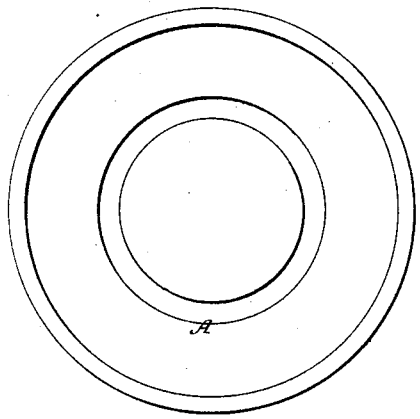
Fig. 2.
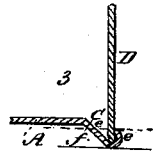
Witnesses.
Inventor.
George F. Stone

UNITED STATES PATENT OFFICE.

GEORGE F. STONE, OF PHILADELPHIA, PENNSYLVANIA, ASSIGNOR TO HIMSELF AND J. H. WHITHURST.

IMPROVEMENT IN SHEET-METAL CANS.

Specification forming part of Letters Patent No. 53,751, dated April 3, 1866.

*To all whom it may concern:*

Be it known that I, GEORGE F. STONE, of the city of Philadelphia, in the State of Pennsylvania, have invented a new and useful Mode of Attaching and Soldering the Ends or Bottoms and Tops of Sheet-Metal Vessels; and I do hereby declare that the following is a full, clear, and exact description of the construction and operation of the same, reference being had to the accompanying drawings, making a part of this specification, in which—

Figure 1 is a central vertical section of a cylindrical can having its bottom and top attached and soldered to its sides in the said new mode; and Fig. 2, a plan view of the under side of the bottom, like letters indicating the same parts when in both figures.

The principal object of this invention is to expedite, and consequently to cheapen, the manufacture of sheet-metal vessels by so constructing and attaching their ends or tops and bottoms that the soldering of the same can be instantly effected by simply passing the ends of the vessels through, or dipping them into, a shallow bath of melted solder.

It consists of a disk forming the top or bottom of a tinned-plate vessel having a groove for the reception and retention of the edge of the body of the vessel, the said groove and the turned-up lip which forms the same being constructed and arranged in the manner described hereinafter, and the whole being applied to a bath of molten solder having a depth so arranged in respect to the said disk and its groove that the solder, while capable of running into the groove and securing the fastening, cannot reach either the upper or under surface of the disk which forms the end of the vessel.

In the drawings, A is the bottom of the can, B the top, C C the grooves in the same, and D D the body of the vessel. The grooves C C are each formed, as shown in the drawings, so that the plane of the outer edge shall be a short distance below the general plane of the disk or plate in which it is formed, as indicated by the dotted line $x$ in Fig. 1. The peculiar form of and the mode of attaching the groove to the body of the vessel will be more distinctly perceived by referring to an enlarged diagram, Fig. 3, in which $e$ is the outer edge of the groove, and shown, by the dotted line thereon, to be a short distance below the plane of the bottom disk, A. The inner edge or side, $f$, of the groove C is inclined toward the center of the vessel, so as to leave an angular groove around in the inner side of the vessel after the body has been inserted or the disk attached, as seen in the figure. After the body and disk are placed in juxtaposition with each other they are then attached or secured together by compression between the usual compressing-rollers, and at the same time flared thereby outwardly a little, as indicated in the figure, so as to effectually prevent them from being easily separated from each other. The tops and bottoms of the vessel being attached firmly to its body in the manner described, it is then dipped into or pushed across through any suitable bath of melted solder whose depth is kept so that in dipping or passing the vessel through the bath the solder therein will just cover the outer edge $e$ of the groove C, and therefore run into and fill the inner groove to the same height, as indicated by the dotted lines in Figs. 1 and 2, and thus effectually and instantly solder the joint without coming in contact with the broader under surface of the disk or plate A or B. On the removal of the vessel from the bath the solder in the groove becomes set and the work complete.

By this mode of attaching and soldering sheet-metal vessels, a boy or any ordinary workman can solder in the most perfect manner one thousand of the usual size sheet-metal fruit-cans in the short space of two and a half hours, whereas, by the old mode of soldering—per hand-copper—it takes six days' work of ten hours each for a good workman to solder the same number of cans even in an imperfect manner.

I am aware that a patent dated June 23, 1863, was granted to H. Miller for forming the junction or union between the sides and the top or bottom of a can or other vessel made of sheet metal by means of a double-recessed clamping lap-joint, in securing which a bath of molten solder was used; this I do not claim; but—

I claim as my invention, and desire to secure by Letters Patent—

The disk A, which forms the end of a tinned-plate vessel, and its groove C, constructed as described, for the reception of the edge of the body D, when the whole is applied to a bath of molten solder, having its depth arranged in respect to the said disk and its grooove, as set forth, for the purpose specified.

GEORGE F. STONE.

Witnesses:
BENJ. MORISON,
JAMES P. DIX.